United States Patent [19]

Sakakiya

[11] Patent Number: 4,595,985
[45] Date of Patent: Jun. 17, 1986

[54] ELECTRONIC CASH REGISTER

[75] Inventor: Yoshifumi Sakakiya, Nagaokakyo, Japan

[73] Assignee: Omron Tateisi Electronics Co., Kyoto, Japan

[21] Appl. No.: 523,588

[22] Filed: Aug. 16, 1983

[30] Foreign Application Priority Data

Aug. 25, 1982 [JP] Japan .................. 57-148426

[51] Int. Cl.⁴ .................. G06F 15/30; G07D 1/06; G08B 13/02; G07C 5/00
[52] U.S. Cl. .................. 364/405; 364/404; 364/406; 235/7 R; 235/22
[58] Field of Search .................. 364/405, 404; 235/7, 235/22

[56] References Cited

U.S. PATENT DOCUMENTS

| | | | |
|---|---|---|---|
| 3,916,386 | 10/1975 | Teixelig | 364/900 |
| 4,035,792 | 7/1977 | Price | 235/22 |
| 4,070,564 | 1/1978 | Tucker | 364/405 |
| 4,101,745 | 7/1978 | Smith | 235/22 |
| 4,142,235 | 2/1979 | Tadakuma | 364/405 |
| 4,276,598 | 6/1981 | Inoue | 364/405 |
| 4,282,674 | 8/1981 | Schoenfield | 235/1 E X |
| 4,360,796 | 11/1982 | Shocknesse | 340/51 |
| 4,399,508 | 8/1983 | Nakayani | 364/405 |

FOREIGN PATENT DOCUMENTS 56-137466 10/1981 Japan .................. 364/405

Primary Examiner—Charles E. Atkinson
Assistant Examiner—Charles B. Meyer
Attorney, Agent, or Firm—Wegner & Bretschneider

[57] ABSTRACT

This disclosure is directed to an improved electronic cash register which includes a detecting device for detecting that a cash drawer of the cash register is opened, a warning device for effecting processings of warning, and a control circuitry which performs the warning processings by the warning device when the detecting device does not detect the opening of the cash drawer within a predetermined period of time after output of an open instruction for the cash drawer.

5 Claims, 3 Drawing Figures

ELECTRONIC CASH REGISTER

BACKGROUND OF THE INVENTION

The present invention generally relates to a cash accounting apparatus for use in a business transaction and more particularly, to an electronic cash register which is so arranged that after keying-in classifications of commercial articles and sum of money therefor, an operator opens a cash drawer of the cash register for receiving or paying out money in cash.

Generally, in conventional electronic cash registers (which are sometimes referred to as ECR) of the above described type, there is provided a function which will not allow ordinary money registration to be effected unless its cash drawer is closed, in order to prevent possible irregular practices by a certain unfair operator. However, since the above function is based on the checking as to whether or not the drawer is closed at the starting of the registration, it becomes possible to effect illicit registration, for example, by sealing a sensor or detector for detecting closure of the cash drawer with a tape or the like to establish a false state as if the drawer was closed, when said drawer is actually in an opened state.

SUMMARY OF THE INVENTION

Accordingly, an essential object of the present invention is to provide an improved electronic cash register which is capable of positively preventing any possible illicit act by an unfair operator, with substantial elimination of disadvantages inherent in the conventional electronic cash registers of this kind.

Another important object of the present invention is to provide an electronic cash register of the above described type which is simple in construction and stable in functioning, and can be readily manufactured at low cost.

In accomplishing these and other objects, according to one preferred embodiment of the present invention, there is provided an electronic cash register which comprises a detecting means for detecting opening of a cash drawer thereof, a warning means for effecting processings of warning, and a controlling means for performing the warning processings by said warning means when said detecting means does not detect the opening of the cash drawer within a predetermined period of time after output of an open instruction for the cash drawer.

By the arrangement of the present invention as described above, in the case where the detecting means does not detect the opening of the drawer within the predetermined period of time after the output of the open instruction of the cash drawer, it is implied that the electronic cash register is under a wrong condition in which the detecting means or detector is sealed or blocked, for example, by a tape and the like, and thus, any possible illicit operations by an operator can be readily found for positive prevention of such unfair acts in advance.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
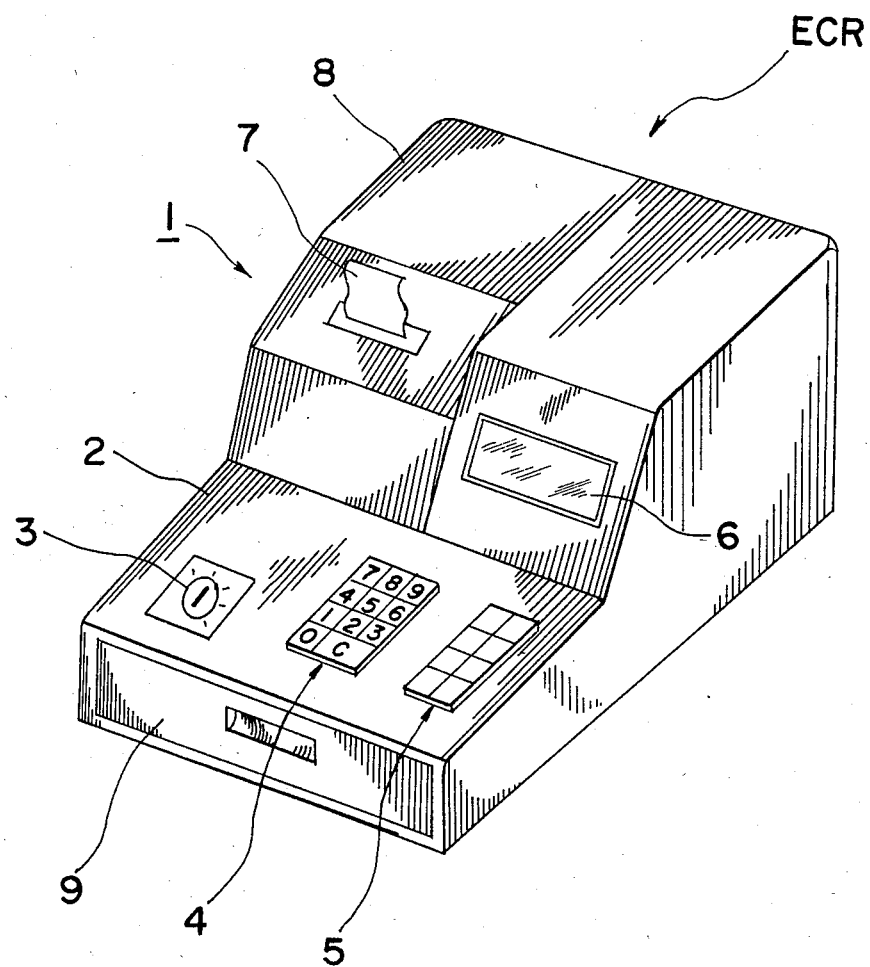
FIG. 1 is a perspective view of an electronic cash register to which the present invention may be applied.

Before the description of the present invention proceeds, it is to be noted that like parts are designated by like reference numerals throughout the accompanying drawings.

Referring now to the drawings, there is shown in FIG. 1 an electronic cash register ECR according to one preferred embodiment of the present invention, which generally includes a main body 1 of a cubic box-like configuration, a keyboard 2 provided at the front upper portion of the main body 1 and having a mode selection switch 3, ten-keys 4 and various function keys 5 arranged side by side, an indicator 6 for indicating the sum of money and a printer 8 for printing out receipt 7 provided above the keyboard 2, and a cash drawer 9 movably disposed in the main body 1 at a position below the keyboard 2 for selective insertion into or withdrawal from said main body 1.

Figure 2:
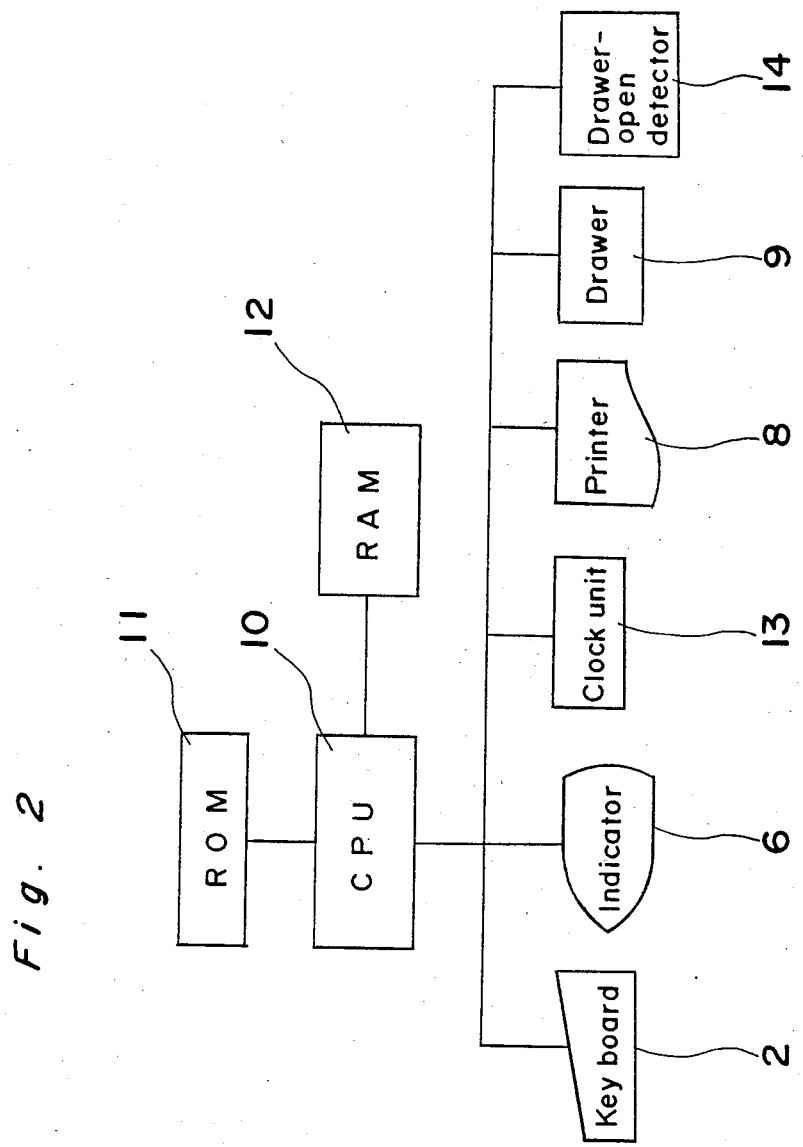
FIG. 2 is a block diagram illustrating a control circuit for the electronic cash register of FIG. 1.

Referring also to FIG. 2 showing a block diagram of a control circuit for the electronic cash register of FIG. 1, the control circuit includes a CPU (central processing unit) 10 connected to an ROM (read only memory) 11 and an RAM (random access memory) 12, and also coupled to the keyboard 2, indicator 6, clock unit 13, printer 8, drawer 9 and a drawer-open detector 14.

In FIG. 2, the CPU 10 controls the respective circuit devices coupled therewith according to the control program stored in the ROM 11, while the RAM 12 is so arranged that sales data corresponding to respective classifications of commercial articles may be stored therein, and also, that a flag of "drawer-connect" for judgement as to whether or not the cash drawer 9 is of the mode connected to the control circuit of the ECR, and a flag of "compulsory drawer" for judgement as to whether or not the cash drawer 9 is of the mode not to be registered when it is open, can be set therein.

The clock unit 13 effects time counting of a predetermined time, and the cash drawer 9 is opened by a proper driving mechanism (not shown) based on the output of "drawer-open instruction". The drawer-open detector 14 is constituted, for example, by a photoelectric sensor for detecting opening of the cash drawer 9.

Referring further to a flow-chart of FIG. 3, registration processings of the electronic cash register ECR as described so far will be explained hereinbelow.

For the registration of commercial articles in the electronic cash register ECR of FIG. 1, with the mode selection switch 3 set to the registration mode, classifications of the commercial articles and sum of money therefor are input to the cash register ECR by the ten-keys 4 and predetermined ones of the function keys 5. The sum of money is indicated on the indicator 6, and is also printed out on the receipt 7 by the printer 8, and the cash drawer 9 is opened after depression of the cash accounting key so as to effect cash dispensing generally in the similar manner as in the conventional cash registers.

Figure 3:
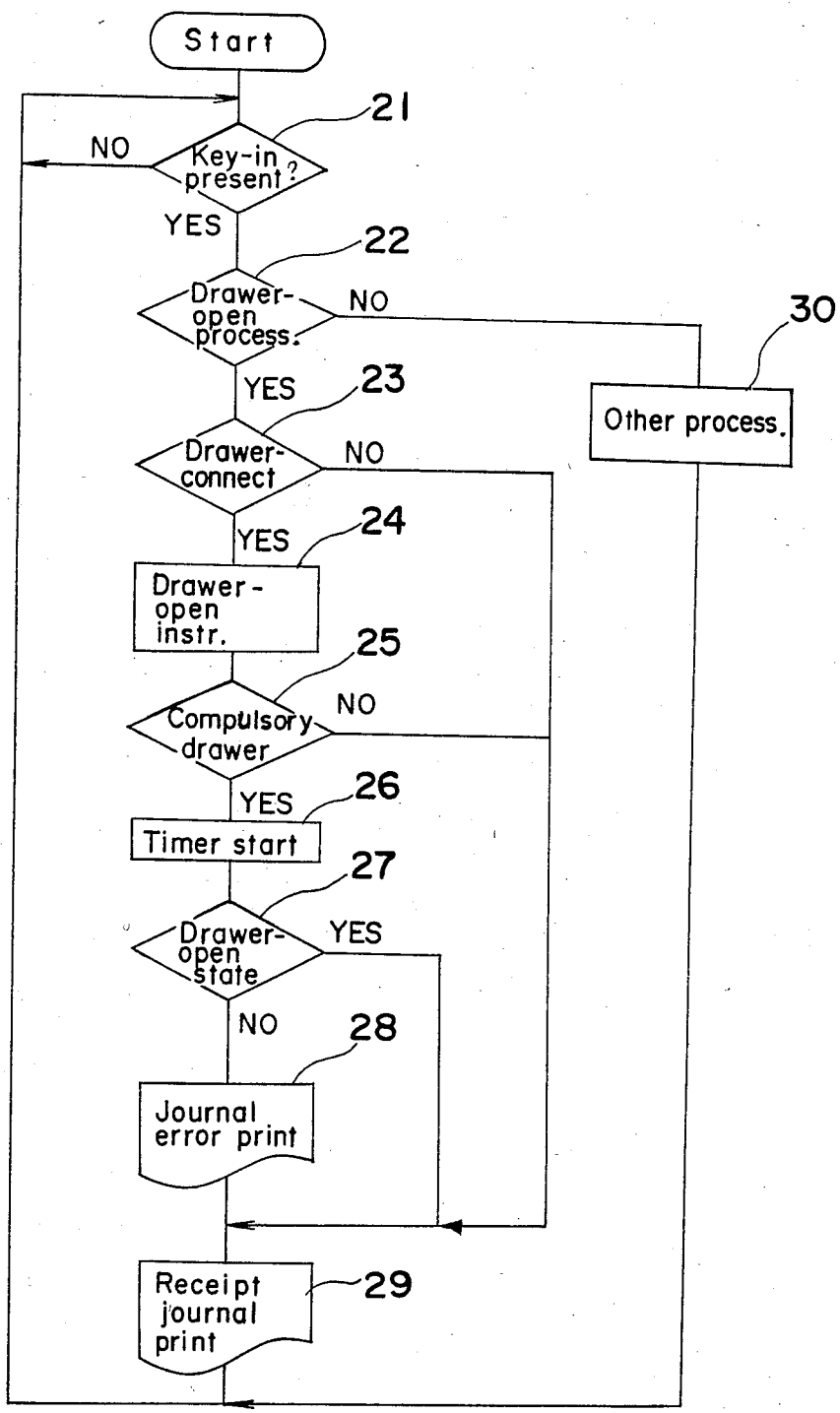
FIG. 3 is a flow-chart explanatory of of the electronic cash register of FIG. 1.

In FIG. 3, at a step 21, the CPU 10 judges whether or not the key-in is effected from the keyboard 2, and in the presence of the key-in, judgement is made at a step 22, as to whether or not the mode is for opening the cash drawer 9 for processing, and if not, the processings of the mode are effected at a step 30.

At the step 22, when it is judged that the processing is for opening the cash drawer 9, the flag for "drawer-connect" of the RAM 12 is read out at a step 23 for judgement as to whether or not the cash drawer 9 is connected to the ECR. When the drawer 9 is not connected thereto, the step is skipped to a step 29, but if said drawer 9 is connected thereto, the CPU 10 applies an "open" instruction to the cash drawer 9 at a step 24.

At a step 25, the CPU 10 successively produces a flag of "compulsory drawer" of the RAM 12 so as to judge whether or not the mode is one permitted to be registered when the cash drawer 9 is open. If the mode is one not permitted to be registered during opening of the cash drawer, the step is skipped to the step 29, but if the mode is one permitted to be registered, the clock unit 13 is started at a step 26 for counting the time required for causing the cash drawer 9 to open.

At a step 27, the CPU 10 judges whether or not the drawer-open detector 14 has detected the opening of the cash drawer 9, based on the detection signal thereof.

In the above judgement, if the opening of the cash drawer 9 is not detected, the functioning is judged as "abnormal", resulting from, for example, intentional sealing of the detector 14 by a tape or the like, or some troubles in the detector 14 itself, and the printer 8 prints out the letter for "error" on a journal (not particularly shown) incorporated in the cash register at a step 28.

On the other hand, when the detector 14 has detected the opening of the cash drawer 9, this is regarded as "normal" processing, and at the step 29, the printer 8 prints out the sales data on the receipt 7 and the incorporated journal, and the receipt 7 is discharged.

Accordingly, any illicit operations of the cash register may be readily discovered later by checking for the "error" print out in the journal, which serves as the warning processings against any unfair acts.

It should be noted here that in the foregoing embodiment, although the warning means is based on the "error" print out on the journal incorporated in the cash register, such warnings may be given by other means, for example, alarm producing means such as driving of the buzzer, lamp, etc.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An electronic cash register which comprises a transaction determining means which determines that a predetermined operation is correctly performed and outputs an open instruction to open a cash drawer of the cash register, a detecting means for detecting the opening of the cash drawer, a warning means providing a warning signal, and a controlling means for actuating said warning means when said detecting means does not detect the opening of the cash drawer within a predetermined period of time after output of the open instruction by the transaction determining means.

2. An electronic cash register as claimed in claim 1, wherein said detecting means is a photoelectric sensor.

3. An electronic cash register as claimed in claim 1, wherein said warning means produces "error" print out on a journal incorporated in said cash register.

4. An electronic cash register as claimed in claim 1, wherein said warning means is a buzzer which produces a sound for warning.

5. An electronic cash register as claimed in claim 1 wherein the warning means is a lamp which is energized to give a warning.

* * * * *